United States Patent
Kim et al.

(10) Patent No.: US 7,788,236 B2
(45) Date of Patent: Aug. 31, 2010

(54) SYSTEMS AND METHODS FOR STORING VIDEO DATA

(75) Inventors: Ho-seon Kim, Suwon-si (KR); Jong-woo Bae, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 357 days.

(21) Appl. No.: 11/889,769

(22) Filed: Aug. 16, 2007

(65) Prior Publication Data
US 2008/0098052 A1 Apr. 24, 2008

(30) Foreign Application Priority Data
Aug. 16, 2006 (KR) .................... 10-2006-0077123

(51) Int. Cl.
*G06F 7/00* (2006.01)
(52) U.S. Cl. .................. 707/692; 707/737; 386/46; 386/83; 386/85; 725/38; 725/39; 725/44; 725/46; 725/115
(58) Field of Classification Search ............. 707/1–6, 707/10, 100, 737, 999.01, 999.1; 386/46, 386/83, 85; 725/38, 39, 44, 46, 115
See application file for complete search history.

(56) References Cited

U.S. PATENT DOCUMENTS

| 5,829,005 | A | 10/1998 | Senator |
| 6,486,667 | B1 * | 11/2002 | Wu et al. .................. 324/306 |
| 7,194,563 | B2 * | 3/2007 | Plourde, Jr. ............. 707/E17.01 |
| 7,260,311 | B2 * | 8/2007 | Okujima et al. ............... 386/85 |

(Continued)

FOREIGN PATENT DOCUMENTS

JP  2005-159853  6/2005

(Continued)

OTHER PUBLICATIONS

Zachary N. J. Peterson & Randal C. Burns—"Ext3cow: The design, implementation, and analysis of metadata for a time-shifting file system"—Technical report HSSL-2003-03 (Mar. 2003—Citeseerr (pp. 1-14).*

(Continued)

*Primary Examiner*—Jean B. Fleurantin
*Assistant Examiner*—Anh Ly
(74) *Attorney, Agent, or Firm*—Harness, Dickey & Pierce, P.L.C.

(57) ABSTRACT

A system for storing video data may include at least one file. The at least one file may include a data cluster including a plurality of data blocks, each data block storing at least some of the video data, and/or a plurality of first pointers sequentially arranged and respectively indicating the plurality of data blocks. The at least one file may be used for time-shifting and recording functions. If the at least one file is used for the time-shifting function, the system may delete contents of the first pointers in a circular manner so that the system sequentially deletes the contents of at least some of the first pointers and/or if the system sequentially deletes the contents of a first pointer that is located last in the arrangement, the next first pointer whose contents are to be sequentially deleted is a first pointer that is located first in the arrangement.

20 Claims, 5 Drawing Sheets

U.S. PATENT DOCUMENTS

| | | | |
|---|---|---|---|
| 7,269,338 B2* | 9/2007 | Janevski | 386/96 |
| 7,380,029 B2* | 5/2008 | Plourde, Jr. | 707/E17.01 |
| 7,454,166 B2* | 11/2008 | Patsiokas et al. | 455/3.06 |
| 7,551,832 B2* | 6/2009 | Plourde, Jr. | 725/100 |
| 2002/0124099 A1* | 9/2002 | Srinivasan et al. | 709/231 |
| 2003/0072556 A1* | 4/2003 | Okujima et al. | 386/46 |
| 2003/0093790 A1* | 5/2003 | Logan et al. | 725/38 |
| 2003/0108331 A1* | 6/2003 | Plourde et al. | 386/83 |
| 2003/0110504 A1* | 6/2003 | Plourde et al. | 725/89 |
| 2004/0266336 A1* | 12/2004 | Patsiokas et al. | 455/3.04 |
| 2006/0282851 A1* | 12/2006 | Errico et al. | 725/39 |
| 2006/0282856 A1* | 12/2006 | Errico et al. | 725/46 |
| 2007/0050832 A1* | 3/2007 | Wright et al. | 725/115 |
| 2007/0128899 A1* | 6/2007 | Mayer | 439/152 |
| 2008/0092168 A1* | 4/2008 | Logan et al. | 725/44 |
| 2008/0152315 A1* | 6/2008 | Peters et al. | 386/124 |
| 2008/0276273 A1* | 11/2008 | Billmaier et al. | 725/37 |

FOREIGN PATENT DOCUMENTS

KR    1020040097520 A    11/2004

OTHER PUBLICATIONS

Windsor W. Hsu and Alan Jay Smith—"Characteristics of I/O traffic in personal computer and sever workloads"—Computer Apr. 2002—IBM research division (pp. 1-39).*

* cited by examiner

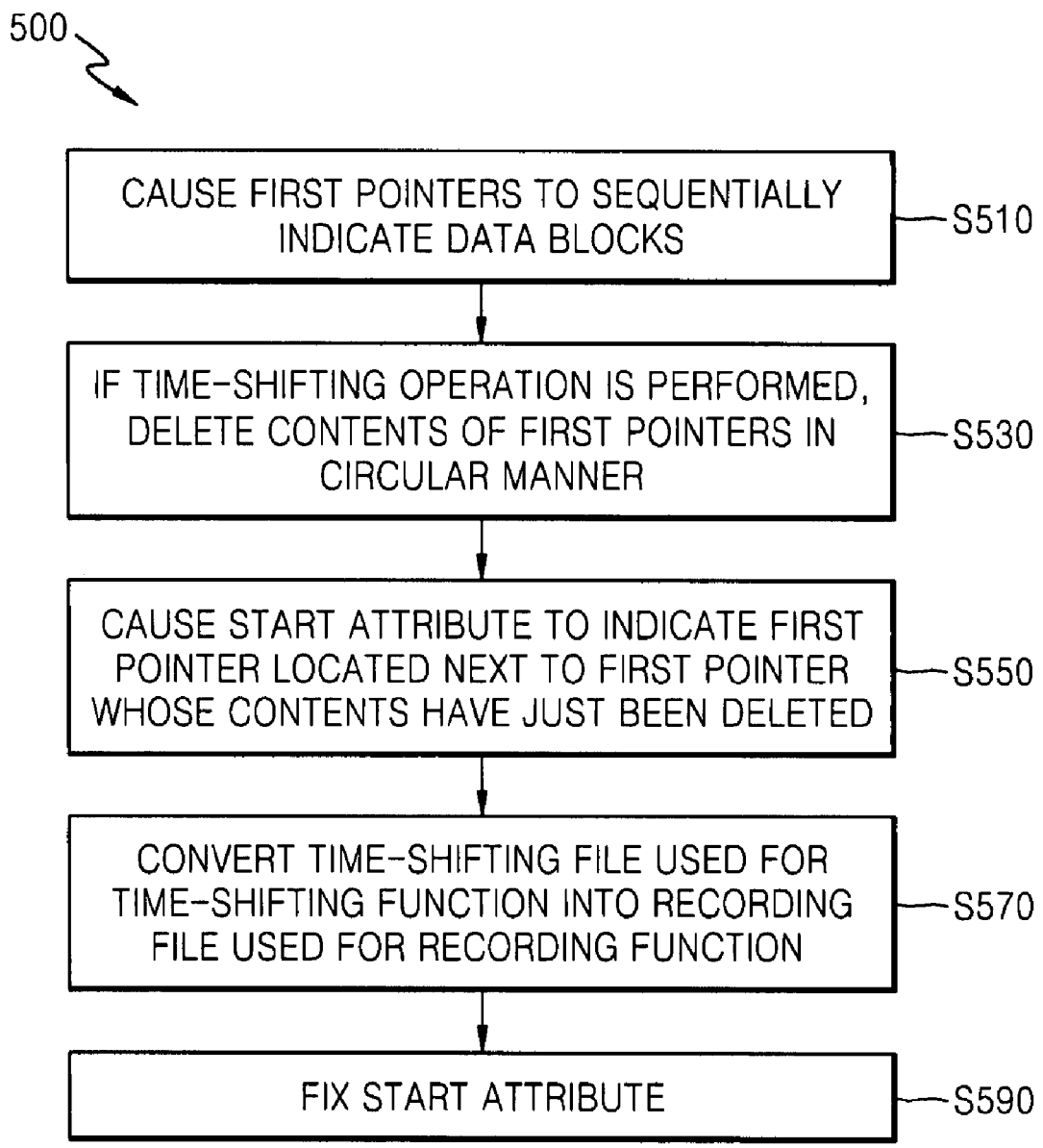

SYSTEMS AND METHODS FOR STORING VIDEO DATA

PRIORITY STATEMENT

This application claims priority from Korean Patent Application No. 10-2006-0077123, filed on Aug. 16, 2006, in the Korean Intellectual Property Office (KIPO), the entire contents which are incorporated herein by reference.

BACKGROUND

1. Field

Example embodiments relate to systems and methods for storing video data. Also, example embodiments relate to video data storing systems including time-shifting files and recording files having a same format, and video data storing methods for the time-shifting files and recording files.

2. Description of Related Art

Personal Video Recording (PVR) products for storing digital broadcasting contents in a storage medium and replaying the digital broadcasting contents have been become widely popular. In general, a PVR product has a recording function and a time-shifting function. The recording function is a function of storing broadcasting contents permanently. Also, the time-shifting function is a function of temporarily storing a live broadcast to allow users to replay the live broadcast within a predetermined time period. The time-shifting function stops a live broadcast during a specific time period, and temporarily stores broadcast contents of the live broadcast during the specific time period. Then, after the specific time period elapses, the live broadcast is again replayed from when the live broadcast was stopped. In order to implement the time-shifting function, it is needed to maintain only broadcast contents broadcasted during a current predetermined time period and delete broadcast contents broadcasted before the current predetermined time period.

SUMMARY

Example embodiments provide a video data storing system including time-shifting files and recording files having the same format.

Example embodiments also provide a video data storing method that is performed by a video data storing system including time-shifting files and recording files having the same format.

According to example embodiments, a system for storing video data may include at least one file. The at least one file may include a data cluster including a plurality of data blocks, each data block storing at least some of the video data and/or a plurality of first pointers sequentially arranged and respectively indicating the plurality of data blocks. The at least one file may be used for a time-shifting function and/or a recording function. If the at least one file is used for the time-shifting function, the system may delete contents of the plurality of first pointers in a circular manner so that the system may sequentially delete the contents of at least some of the plurality of first pointers and/or if the system sequentially deletes the contents of a first pointer that is located last in the sequential arrangement, the next first pointer whose contents are to be sequentially deleted may be a first pointer that is located first in the sequential arrangement.

According to example embodiments, a method for storing video data that is performed by a video data system, wherein the video data system may includes at least one file including a data cluster and/or a plurality of first pointers sequentially arranged and wherein the data cluster may include a plurality of data blocks, each data block storing at least some of the video data, may include: causing the plurality of first pointers to sequentially indicate the plurality of data blocks; and/or sequentially deleting contents of at least some of the plurality of first pointers in a circular manner if a time-shifting function is performed. If the contents of a first pointer that is located last in the sequential arrangement is sequentially deleted, the next first pointer whose contents are to be sequentially deleted may be a first pointer that is located first in the sequential arrangement.

BRIEF DESCRIPTION OF THE DRAWINGS

The above and/or other aspects and advantages will become more apparent and more readily appreciated from the following detailed description of example embodiments taken in conjunction with the accompanying drawings, in which:

FIG. 5 is a flowchart of a video data storing method according to example embodiments.

DETAILED DESCRIPTION OF EXAMPLE EMBODIMENTS

Figure 1:
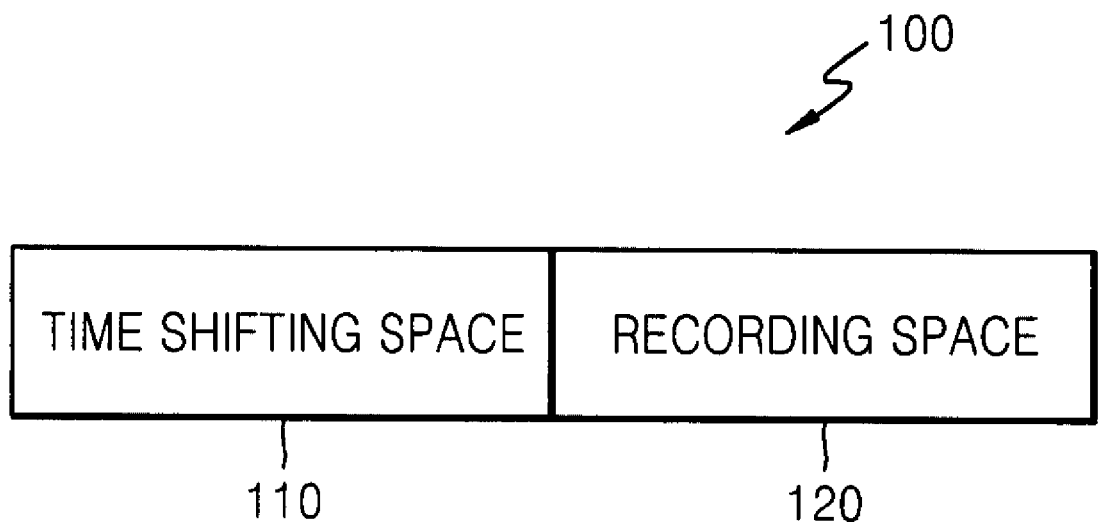
FIG. 1 is a view for explaining a time-shifting method that is performed by a related art video system for comparison to example embodiments.

Example embodiments will now be described more fully with reference to the accompanying drawings. Embodiments, however, may be embodied in many different forms and should not be construed as being limited to example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a view for explaining a time-shifting method that is performed by a related art video system 100 for comparison to example embodiments.

Referring to FIG. 1, in the video system 100 for comparison to example embodiments, a storage space 110 for time shifting is separated from a storage space 120 for recording in a storage medium. However, in the case where the storage space 110 for time shifting is separated from the storage space 120 for recording, the following problems occur.

First, an amount of broadcast contents that is temporarily stored by time shifting can vary. However, in the time-shifting method for comparison to example embodiments, the storage space 110 for time shifting has to be prepared in advance. Therefore, the storage space 110 for time shifting has to be prepared to be at a maximum according to a maximum amount of time shifting allowable.

Second, if a user uses the time-shifting function frequently, the storage space 110 for time shifting will be used more frequently than the storage space 120 for recording. Accordingly, a problem occurs in that the video system 100 has to be frequently replaced by a new one.

Third, it is difficult to record broadcast contents that are temporarily stored by time shifting. That is, in order to record broadcast contents that are temporarily stored by time shifting, the broadcast contents have to be copied many times. In this case, due to an overhead caused by copying, a PVR system cannot perform the other functions.

Figure 2:
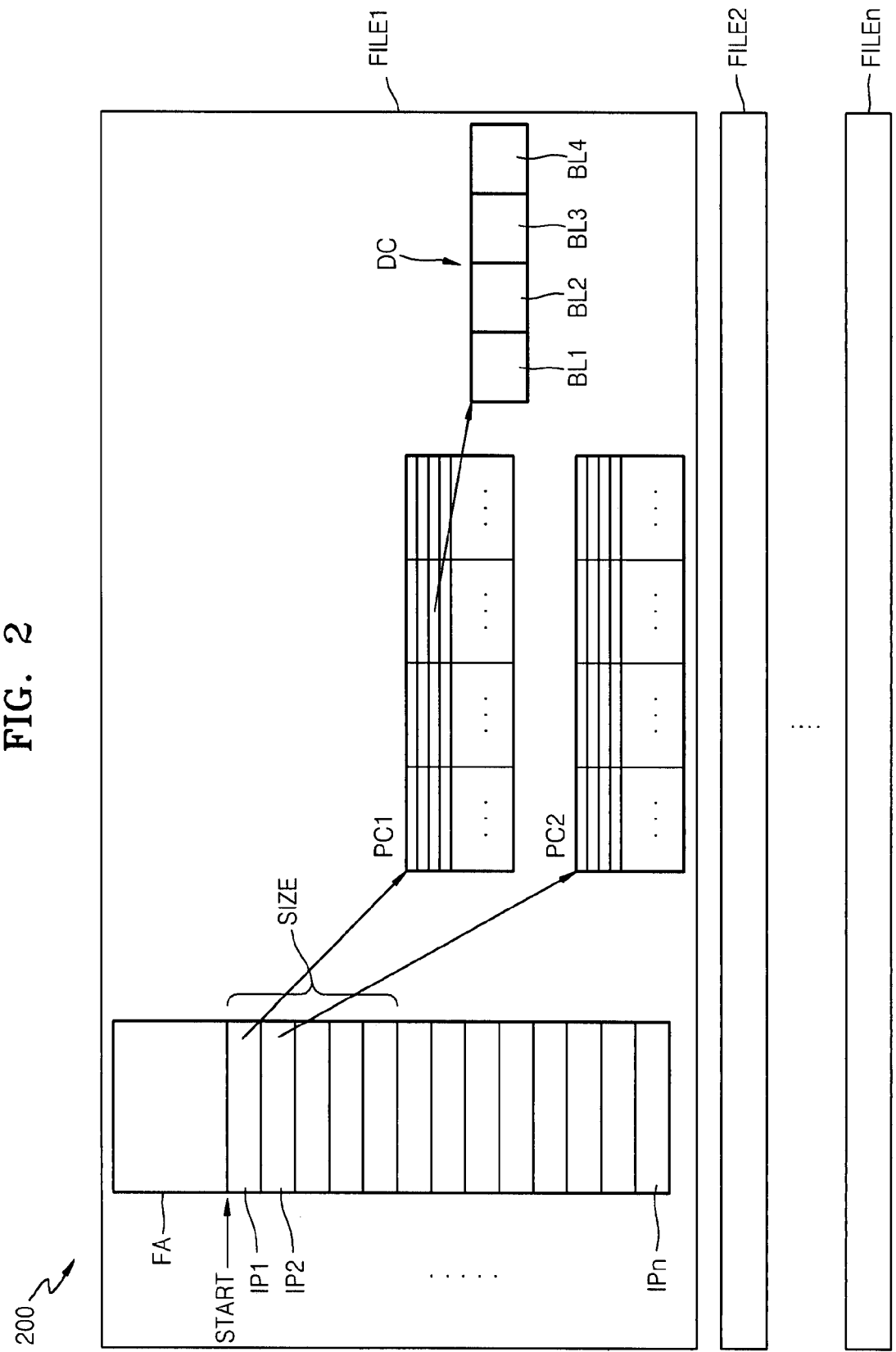
FIG. 2 is a view for explaining a video data storing system according to example embodiments.

FIG. 2 is a view for explaining a video data storing system 200 according to example embodiments.

Referring to FIG. 2, the video data storing system 200 may include one or more files FILE1 through FILEn. Each file may include a data cluster DC and/or a plurality of first pointers IP1 through IPn.

The data cluster DC may include a plurality of data blocks, each data block storing video data. The first pointers IP1 through IPn may be sequentially arranged, and each first pointer may indicate a data block among the data blocks BL1 through BL4.

Figure 3:
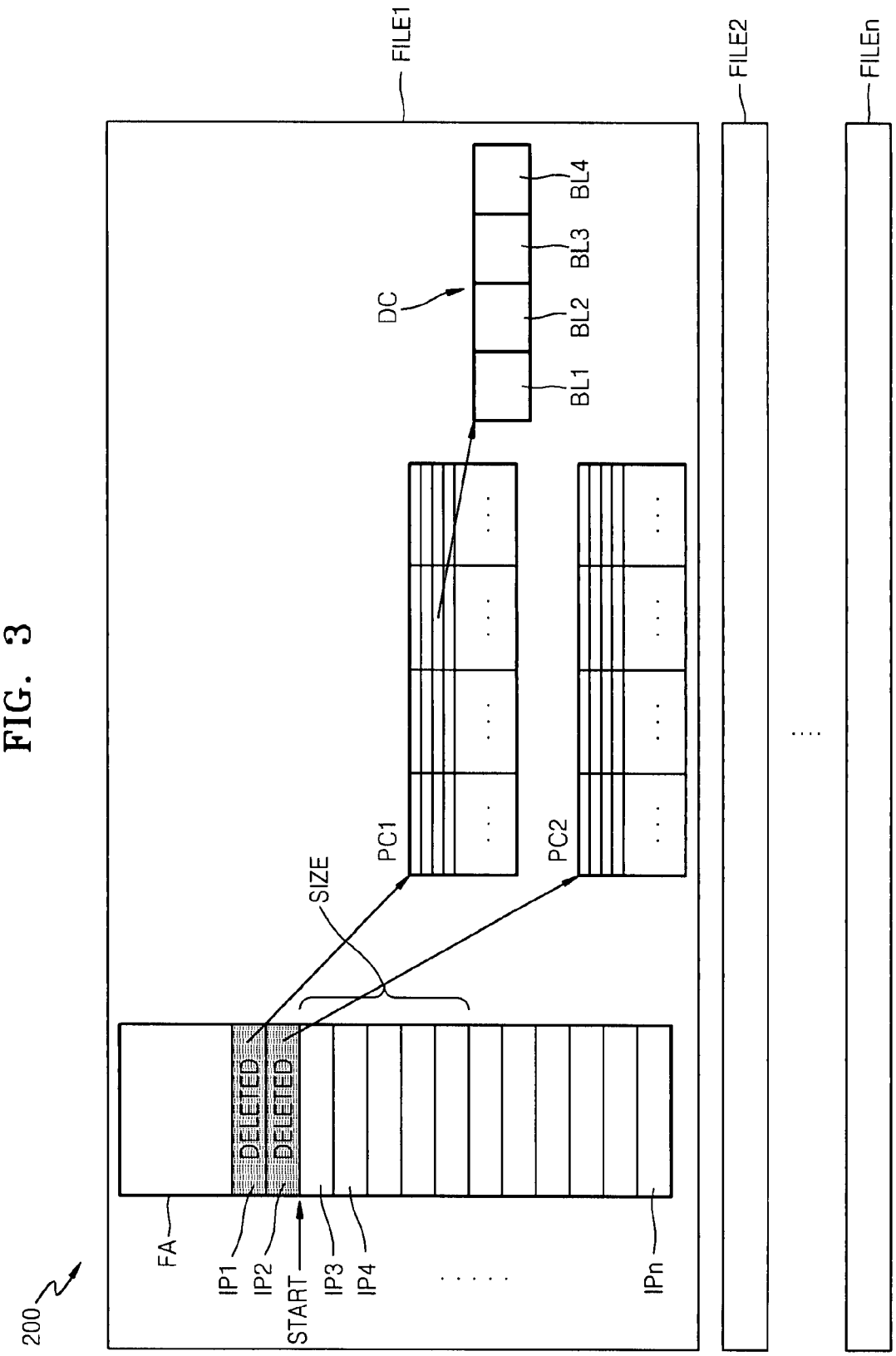
FIG. 3 is a view for explaining an operation in which first pointers are deleted in a circular manner in the video data storing system illustrated in FIG. 2.

Although there may be 2, 3, 4, 5, 6, 7, 8, or more data blocks, FIGS. 2 and 3 depict example embodiments in which there may be four such data blocks. Similarly, although there may be 2, 3, 4, 5, 6, 7, 8, or more of the optional pointer clusters (discussed below), FIG. 3 depicts example embodiments in which there may be two such pointer clusters. Although there may be no set relationship between the number of data blocks and pointer clusters (for example, there may be four times as many data blocks as pointer clusters, three times as many data blocks as pointer clusters, twice as many data blocks as pointer clusters, an equal number of data blocks and pointer clusters, one half as many data blocks as pointer clusters, one third as many data blocks as pointer clusters, or one quarter as many data blocks as pointer clusters), FIG. 3 depicts example embodiments in which there are twice as many data blocks as pointer clusters. One of ordinary skill in the art would understand that other relationships between the number of data blocks and the number of pointer clusters are possible.

In FIG. 2, each file (for example, FILE1) may include pointer clusters PC1 and PC2, and/or the first pointers IP1 through IPn may indicate the data blocks BL1 through BL4 indirectly through the pointer clusters PC1 and PC2. However, example embodiments are not limited to this, and it is possible that the video data storing system 200 may not include the pointer clusters PC1 and PC2, and/or that the first pointers IP1 through IPn directly indicate the data blocks BL1 through BL4.

Here, a part of data storage areas in the video data storing system 200 may be assigned to the data cluster DC and/or the first pointers IP1 through IPn that may be included in the file FILE1.

Each file (for example, FILE1) may be used for both a time-shifting function and a recording function. If the video data storing system 200 applies a time-shifting function to the file FILE1, the video data storing system 200 may delete the contents of the first pointers IP1 through IPn in a circular manner. That is, the video data storing system 200 may sequentially delete the contents of the first pointers IP1 through IPn, and may delete the contents of the first pointer IP1 that may be first located after deleting the contents of the first pointer IPn that may be finally located. For example, if the system sequentially deletes the contents of a first pointer IPn that is located last in the sequential arrangement, the next first pointer whose contents may be sequentially deleted may be a first pointer IP1 that is located first in the sequential arrangement. First pointers IP1 through IPn for which content has been deleted may indicate no data block.

When the video data storing system 200 may apply the time-shifting function to the file FILE1, the video data storing system 200 may delete the contents of a first pointer indicating a data block BL1, BL2, BL3, or BL4 in which video data is stored, after a predetermined time may elapse from when the video data was temporarily stored by the time-shifting function. In detail, the first pointers IP1 through IPn indicating the data blocks BL1 through BL4 may be sequentially deleted in such a way that a first pointer indicating a data block in which video data is previously stored the longest may be first deleted.

The first pointers IP1 through IPn may be indirect pointers. Also, the file FILE1 may further include the pointer clusters PC1 and PC2. Each pointer cluster PC1 or PC2 may include a plurality of second pointers (not shown). The second pointers (not shown) may be indicated by the first pointers IP1 through IPn, and respectively may indicate the data blocks BL1 through BL4. By using the pointer clusters PC1 and PC2, it may be possible to increase the number of data blocks that the first pointers IP1 through IPn may indicate, compared to when the first pointers IP1 through IPn directly indicate the data blocks BL1 through BL4.

The first pointers IP1 through IPn may be pointers having the same format.

The video data storing system 200 may convert a time-shifting file used for the time-shifting function into a recording file used for the recording function, by stopping sequential deleting of the contents of first pointers of the time-shifting file. In this case, the time-shifting file and the recording file may indicate data blocks that may be included in the same data cluster.

Each file (for example, FILE1) may further include a start attribute START representing the location of a first pointer indicating a data block including data that may be first read. The start attribute START may represent the location of a first pointer indicating a data block in which data has been previously stored the longest, among the first pointers IP1 through IPn indicating the data blocks BL1 through BL4. When the first pointers IP1 through IPn may be sequentially deleted while the time-shifting function is performed, the start attribute START may indicate a first pointer that is located next to another first pointer whose contents have just been deleted.

In the video data storing system 200, if a time-shifting file used for the time-shifting function is converted into a recording file used for the recording function, the start attribute START may be fixed.

Each file (for example, FILE1) may further include a size attribute SIZE. The size attribute SIZE may represent the number of first pointers that actually indicate data blocks, from among the first pointers IP1 through IPn.

At least one of the start attribute START and the size attribute SIZE may be stored in a file attribute region FA of each file (for example, FILE1).

FIG. 3 is a view for explaining an operation in which the first pointers IP1 through IPn are deleted in a circular manner in the video data storing system 200 illustrated in FIG. 2.

Hereinafter, the operation of the video data storing system 200 according to example embodiments will be described with reference to FIGS. 2 and 3.

If the video data storing system 200 performs the time-shifting operation, the video data storing system 200 may delete the contents of the first pointers IP1 through IPn in a circular manner, that is, the video data storing system 200 may sequentially delete the contents of the first pointers IP1 through IPn and/or may delete the contents of the first pointer IP1 that may be first located after deleting the contents of the first pointer IPn that may be finally located. For example, if the system sequentially deletes the contents of a first pointer IPn that is located last in the sequential arrangement, the next first pointer whose contents are to be sequentially deleted may be a first pointer IP1 that is located first in the sequential arrangement.

FIG. 2 shows the file FILE1 from which the contents of the first pointers IP1 through IPn may not be deleted. In this case, a start attribute START may indicate a first pointer IP1 that may be first located, and a size attribute SIZE may indicate five first pointers. FIG. 3 shows the file FILE1 from which the contents of two first pointers IP1 and IP2 may be deleted. In this case, the start attribute START may indicate a first pointer IP3 that may be located next to the first pointer IP2 whose contents have just been deleted.

The first pointers IP1 through IPn may indicate second pointers (not shown) included in the pointer clusters PC1 and PC2. The second pointers (not shown) respectively may indicate the data blocks BL1 through BL4 included in the data cluster DC.

When the video data storing system 200 converts a time-shifting file into a recording file used for the recording function, the video data storing system 200 may stop sequential deleting of the contents of first pointers of the time-shifting file, and may fix a start attribute. That is, the location of a start attribute when deleting for the time-shifting file is stopped may be set to a start location of the recording file. Here, the start location of the recording file means a location from which the contents of the recording file may begin to be read.

Figure 4:
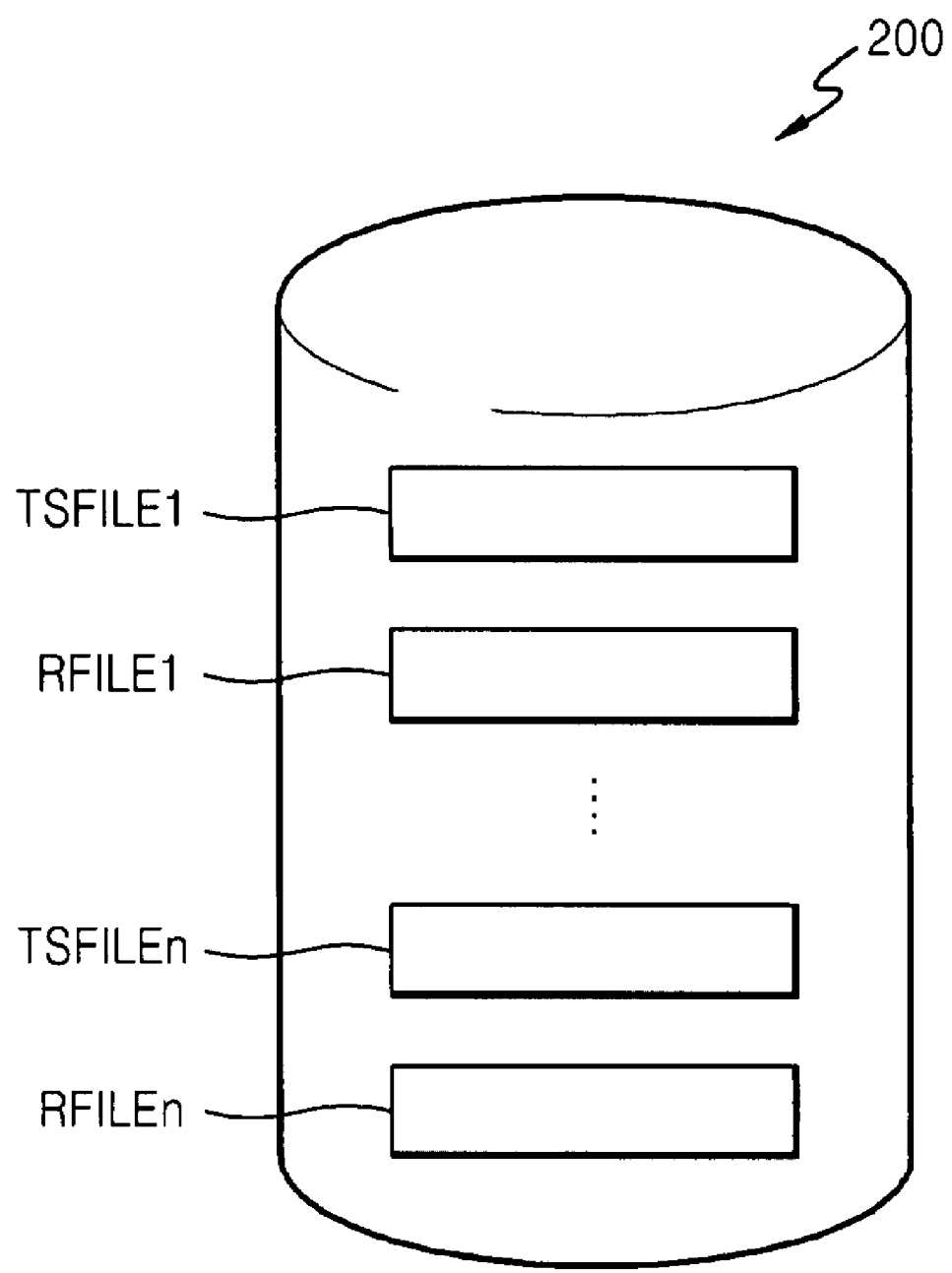
FIG. 4 illustrates a configuration in which time-shifting files and recording files have the same format in the video data storing system illustrated in FIG. 2.

FIG. 4 illustrates a configuration in which time-shifting files and recording files have the same format in the video data storing system 200 illustrated in FIG. 2.

Referring to FIG. 4, the video data storing system 200 may include time-shifting files TSFILE1 through TSFILEn and/or recording files RFILE1 through RFILEn having the same format, in the same storage medium. Also, data blocks in which the time-shifting files TSFILE1 through TSFILEn and the recording files RFILE1 through RFILEn indicate may be included in the same data cluster.

Accordingly, the video data storing system 200 may overcome the problem of a related art video system 100 for comparison to example embodiments (see FIG. 1) which has to ensure a maximum storage space for time shifting. Also, since the video data storing system 200 may continuously vary a storage space for time shifting, the lifetime of a storage medium may increase. Also, since time-shifting files used for the time-shifting function may have the same format as that of recording files used for the recording function, time-shifting files may be easily converted into recording files.

FIG. 5 is a flowchart of a video data storing method 500 according to example embodiments.

The video data storing method 500 may be performed by a video data storing system including at least one file including a data cluster and/or a plurality of first pointers that may be sequentially arranged, wherein the data cluster may include a plurality of data blocks, each data block storing video data. Referring to FIG. 5, the video data storing method 500 may include operations of: causing the first pointers to sequentially indicate data blocks (operation S510); and/or deleting the contents of the first pointers in a circular manner when a time-shifting operation is performed (operation S530). The operation of deleting the contents of the first pointers in the circular manner may be performed by sequentially deleting the contents of the first pointers and/or deleting the contents of a first pointer that is first located after deleting the contents of a first pointer that is finally located. For example, if the system sequentially deletes the contents of a first pointer IPn that is located last in the sequential arrangement, the next first pointer whose contents are to be sequentially deleted may be a first pointer IP1 that is located first in the sequential arrangement.

In the current embodiment, the video data storing method 500 may further include operation S550 that may cause a start attribute to indicate a first pointer that is located next to another first pointer whose contents have just been deleted, after the operation S530 of deleting the contents of the first pointers in the circular manner. Also, the video data storing method 500 may further include operation S570 of converting the time-shifting file used for the time-shifting function into a recording file used for the recording function, by stopping the deleting of the contents of the first pointers in the circular manner. The video data storing method 500 may further include operation S590 of fixing a start attribute when the time-shifting file used for the time-shifting function is converted into the recording file used for the recording function.

The video data storing method 500 may have the same technical concept as the video data storing system 200 as described above, and/or may correspond to the construction of the video data storing system 200. Accordingly, details of the video data storing method 500 may be understood by one of ordinary skill in the art from the above descriptions, and thus detailed descriptions thereof will be omitted.

As described above, in a video data storing system and method according to example embodiments, it may be possible to overcome the problem of related art video systems that have to ensure a maximum storage space for time shifting. Also, since a storage space for time shifting may be varied continuously, the lifetime of a storage medium may be increased. Also, since time-shifting files used for a time-shifting function may have the same format as that of recording files used for a recording function, it may be possible to easily convert a time-shifting file into a recording file.

While example embodiments have been particularly shown and described, it will be understood by those of ordinary skill in the art that various changes in form and details may be made therein without departing from the spirit and scope of the present invention as defined by the following claims.

What is claimed is:

1. A system for storing video data, comprising:
at least one file;
wherein the at least one file comprises:
a data cluster including a plurality of data blocks, each data block storing at least some of the video data; and
a plurality of first pointers sequentially arranged and respectively indicating the plurality of data blocks;
wherein the at least one file is used for both a time-shifting function and a recording function,
wherein the at least one file further comprises:
a start attribute; and
a size attribute;
wherein when a time-shifting file used for the time-shifting function is converted into a recording file used for the recording function, the start attribute is fixed,
wherein the size attribute indicates a number of first pointers actually indicating the data blocks from among the plurality of first pointers, and
wherein if the at least one file is used for the time-shifting function, the system deletes contents of the plurality of first pointers in a circular manner so that:
the system sequentially deletes the contents of at least some of the plurality of first pointers; and
if the system sequentially deletes the contents of a first pointer that is located last in the sequential arrangement, the next first pointer whose contents are to be sequentially deleted is a first pointer that is located first in the sequential arrangement.

2. The system of claim 1, wherein if the at least one file is used for the time-shifting function, the system deletes the contents of first pointers indicating data blocks in which the video data is stored, after a predetermined time elapses from when the video data is stored in the data blocks by the time-shifting function.

3. The system of claim 1, wherein the plurality of first pointers are indirect pointers.

4. The system of claim 3, wherein the at least one file further comprises:
a plurality of pointer clusters;
wherein each pointer cluster includes a plurality of second pointers indicated by the indirect pointers and indicating a data block among the plurality of data blocks.

5. The system of claim 1, wherein the plurality of first pointers have a same format.

6. The system of claim 1, wherein a time-shifting file used for the time-shifting function is converted into a recording file used for the recording function, by stopping the system from deleting the contents of a plurality of first pointers of the time-shifting file in the circular manner.

7. The system of claim 6, wherein the time-shifting file and the recording file indicate data blocks included in a same data cluster.

8. The system of claim 1, wherein the at least one file further comprises:
a start attribute;
wherein the start attribute represents a location of a first pointer indicating a data block including video data that is to be read first.

9. The system of claim 1, wherein the at least one file further comprises:
a start attribute;
wherein the start attribute represents a location of a first pointer indicating a data block including video data that has been stored the longest.

10. The system of claim 1, wherein the at least one file further comprises:
a start attribute;
wherein when the plurality of first pointers are deleted in the circular manner while the time-shifting function is performed, the start attribute indicates a first pointer that is located next to another first pointer whose contents have just been deleted.

11. A method for storing video data that is performed by a video data system, the video data system including at least one file comprising a data cluster and a plurality of first pointers sequentially arranged, wherein the data cluster includes a plurality of data blocks, each data block storing at least some of the video data, the method comprising:
causing the plurality of first pointers to sequentially indicate the plurality of data blocks;
sequentially deleting contents of at least some of the plurality of first pointers in a circular manner if a time-shifting function is performed; and
fixing a start attribute if a time-shifting file used for the time-shifting function is converted into a recording file used for a recording function;
wherein if the contents of a first pointer that is located last in the sequential arrangement is sequentially deleted, the next first pointer whose contents are to be sequentially deleted is a first pointer that is located first in the sequential arrangement;
wherein the at least one file further comprises:
a size attribute; and
wherein the size attribute indicates a number of first pointers actually indicating the data blocks from among the plurality of first pointers.

12. The method of claim 11, wherein sequentially deleting contents of at least some of the plurality of first pointers in a circular manner includes, if the time-shifting function is performed, sequentially deleting the contents of first pointers indicating data blocks in which the video data is stored, after a predetermined time elapses from when the video data is stored in the data blocks by the time-shifting function.

13. The method of claim 11, wherein the plurality of first pointers are indirect pointers.

14. The method of claim 13, wherein the at least one file further comprises:
a plurality of pointer clusters;
wherein each pointer cluster includes a plurality of second pointers indicated by the indirect pointers and each indicating a data block among the plurality of data blocks.

15. The method of claim 11, wherein the plurality of first pointers have a same format.

16. The method of claim 11, further comprising:
converting a time-shifting file used for the time-shifting function into a recording file used for a recording function, by stopping sequentially deleting contents of at least some of the plurality of first pointers of the time-shifting file in the circular manner.

17. The method of claim 16, wherein the time-shifting file and the recording file indicate data blocks included in a same data cluster.

18. The method of claim 11, wherein the at least one file further comprises:
a start attribute;
wherein the start attribute represents a location of a first pointer indicating a data block including video data that is to be read first.

19. The method of claim 11, wherein the at least one file further comprises:
a start attribute;
wherein the start attribute represents a location of a first pointer indicating a data block including video data that has been stored the longest.

20. The method of claim 19, further comprising:
when sequentially deleting contents of at least some of the plurality of first pointers in a circular manner, causing the start attribute to indicate a first pointer that is located next to another first pointer whose contents have just been deleted.

* * * * *